US005640165A

United States Patent [19]
Hui et al.

[11] Patent Number: 5,640,165
[45] Date of Patent: Jun. 17, 1997

[54] RANGE CELL FORMATION PROCESSING

[75] Inventors: Leo H. Hui, Los Angeles, Calif.;
Michael W. Autry, Tucson, Ariz.

[73] Assignee: Hughes Electronics, Los Angeles, Calif.

[21] Appl. No.: 482,336

[22] Filed: Jun. 7, 1995

[51] Int. Cl.$^6$ ...................................................... G01S 7/16
[52] U.S. Cl. ........................... 342/185; 342/179; 342/197
[58] Field of Search .................................. 342/185, 179, 342/197

[56] References Cited

U.S. PATENT DOCUMENTS

| | | | |
|---|---|---|---|
| 3,810,174 | 5/1974 | Heard et al. | 342/185 |
| 4,683,469 | 7/1987 | Elsmore et al. | 345/14 |
| 5,455,591 | 10/1995 | Hui | 342/185 |

*Primary Examiner*—John B. Sotomayor
*Attorney, Agent, or Firm*—Leonard A. Alkov; Wanda K. Denson-Low

[57] ABSTRACT

A range cell formation process that are used to enhance the quality of an image following a perspective transformation from range-azimuth coordinates (B-scan) into elevation-azimuth coordinates (C-scan). The present range cell formation process eliminate situations where there are missing data points at the far range, and large areas that have the same data point at the near range. The range cell formation process evaluates the data content in range cells on a case by case basis using a prioritized system to determine what is to be displayed so that a high level of image contrast is maintained. In the far range, range cell data that are in between range points defined by every two adjacent elevation points are processed and a priority system is used to determine the best intensity value to use for the elevation points. The priority system is such that bright objects have the highest priority, followed by dark objects, and then followed by an average background level. Range cells are processed to determine which priority is met, and then the appropriate intensity is used. If a bright object is detected in the range cells, then the maximum intensity of the range cells is used. If a dark object is detected, then the lowest intensity of the range cells is used. Otherwise, the average intensity of the range cells is used. In the near range, no enhancements are made to reduce the size of large areas, but the size of bright objects is reduced, thereby providing a sense of increased focus in the near range.

5 Claims, 3 Drawing Sheets

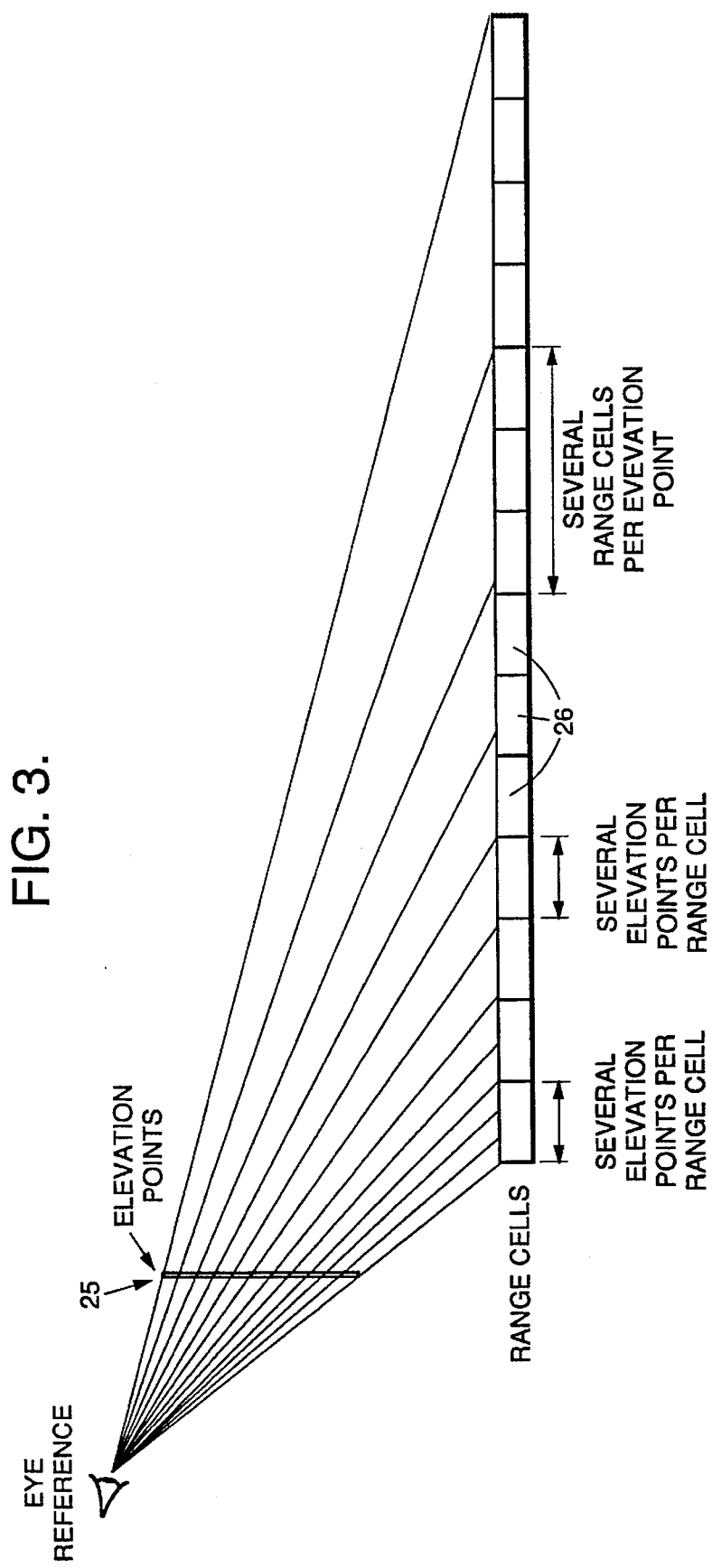

RANGE CELL FORMATION PROCESSING

BACKGROUND

The present invention relates generally to perspective transformation processes employed in radar system signal processors, and more particularly, to a process for enhancing the quality of an image following a perspective transformation from image data in the range-azimuth coordinate system (B-scan) into image data in the elevation-azimuth coordinate system (C-scan).

A product known as a TMC 2301 image resampling sequencer manufactured by TRW LSI Products performs image manipulation in video, graphics, medical, radar, and other image processing systems. It uses a 2nd order Taylor series to perform coordinate transformations from Cartesian (x,y) format to C-scan format. Together with another product known as a TMC 2330 coordinate transformer available from the same company, which transforms from B-scan format to Cartesian format, an approximation to the transformation from B-scan to C-scan formats can be achieved.

Typically the perspective transformation performed by the above-described equipment is not a one-to-one mapping of a point in C-scan with a point in B-scan. For a transformation process that computes a range-azimuth point for a given elevation-azimuth point, there may be many range cells covered by adjacent elevation points in farther range cases, or there may be a single range cell covering many elevation points in nearer range cases. Without image enhancement, such as is performed by the present invention, the transformed image will have missing data points at the far range, and large areas that have the same data point at the near range.

A conventional way to handle the missing data point problem in the far range cases is to average all the range data that is within range cells given by the two adjacent elevation points. However, this will artificially smooth the image contrast at the far range. Normally bright objects such as aircraft, airport lights, trucks, or hangers at the far range will be averaged with the background and will not be seen. Normally dark objects such as runways and taxiways at the far range will also be averaged with the background and will be lost.

In a copending U.S. patent application Ser. No. 08/269,407, filed Jun. 30, 1994, entitled "Precision High Speed Perspective Transformation From Range-Azimuth Format to Elevation-Azimuth Format", assigned to the assignee of the present invention, an improved process for making the above-described B-scan to C-scan transformation is described. The present invention is directed toward improving the quality of the transformed image subsequent to transformation by this and other conventional B-scan to C-scan converters.

In view of the above, it is an objective of the present invention to provide for an image data enhancement process that enhances the image quality of transformed B-scan to C-scan images provided by the perspective transformation processor described in the above-cited patent application and other conventional B-scan to C-scan converters.

SUMMARY OF THE INVENTION

In order to meet the above and other objectives, the present invention is a range cell formation process that are used to enhance the quality of an image following a perspective transformation from range-azimuth coordinates (B-scan) into elevation-azimuth coordinates (C-scan). For B-scan to C-scan transformation processes that compute a range-azimuth point for a given elevation-azimuth point, there may be many range cells covered by adjacent elevation points in farther range cases, or there may be a single range cell covering many elevation points in nearer range cases. The present range cell formation process eliminate situations where there are missing data points at the far range, and large areas that have the same data point at the near range.

The range cell formation process eliminates the far range problems discussed in the Background section by evaluating the data content in the range cells on a case by case basis and using a prioritized system to determine what is to be displayed so that a high level of image contrast is maintained. In the near range case, typically there are no enhancements made to reduce the size of large areas because these large areas are due to the finite sampling size in range. The range cell formation process, however, reduces the largeness of bright objects, thereby providing a sense of increased focus in the near range.

The range cell formation process has been adapted for use in an enhanced vision sensor radar system manufactured by the assignee of the present invention that is primarily used to enhance the C-scan image of an airport that is displayed on a head-up display. The enhanced vision sensor system is used in commercial aircraft to aid low visibility landing, takeoff, and taxi operations. The present invention enhances the displayed image and provides for better contrast of the image that is presented to an observer. The range cell formation process may be used with any perspective imaging system using a radar or laser radar.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which:

FIG. 3 is a diagram illustrating the relationship between elevation points and range cell coverage.

DETAILED DESCRIPTION

Figure 1:
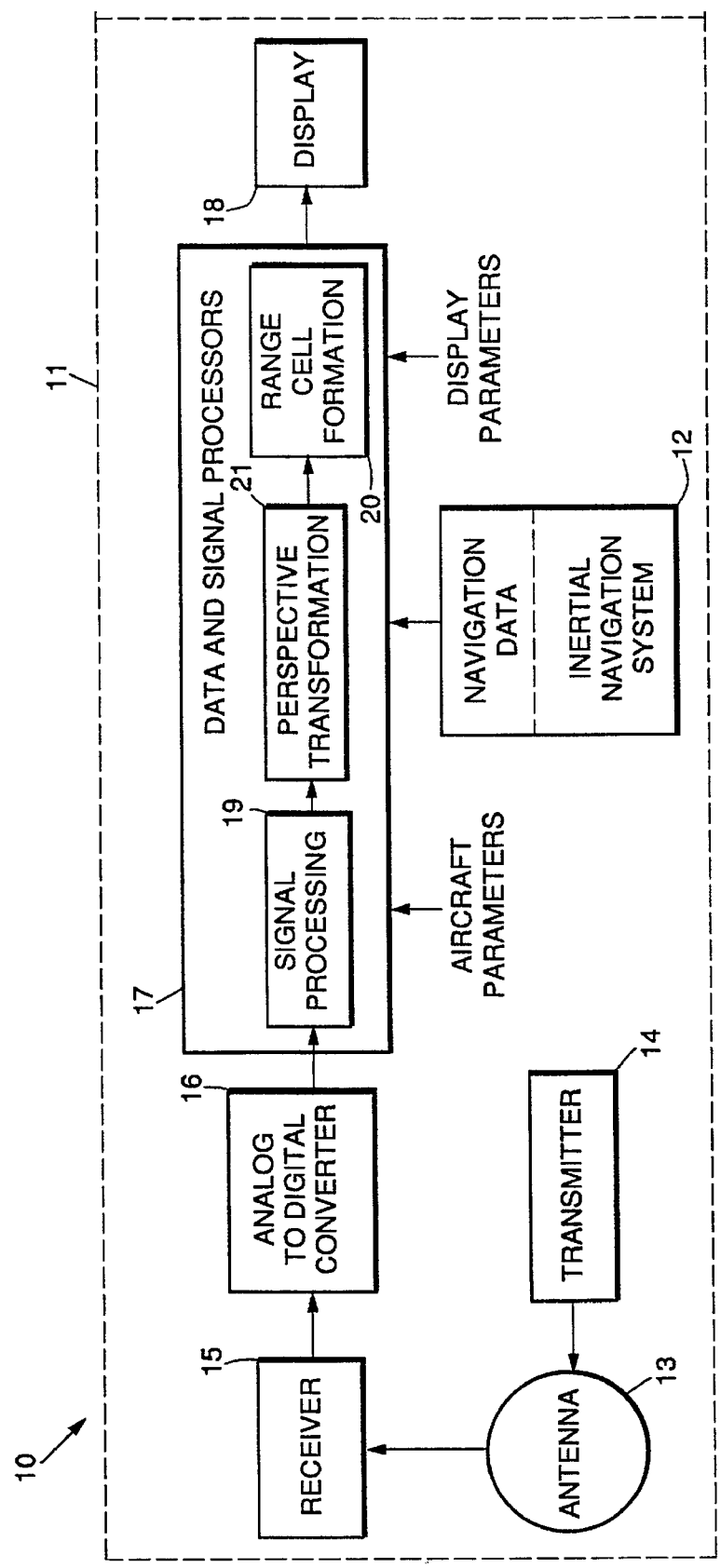
FIG. 1 shows a block diagram of a radar system in which a range cell formation process in accordance with the principles of the present invention is employed.

Referring to the drawing figures, FIG. 1 shows a block diagram of a radar system 10 in which a range cell formation processor 20 that implements a process 30 in accordance with the principles of the present invention are employed. The radar system 10 is disposed on an aircraft 11 (generally shown) that includes an inertial navigation system (INS) 12 that provides navigation data. The radar system 10 is comprised of an antenna 13 and a transmitter 14 and receiver 15 coupled to the antenna 13 for transmitting and receiving radar signals. An analog-to-digital converter 16 is coupled to the receiver 15 for digitizing received radar signals. A data and signal processor 17 is coupled to the analog-to-digital converter 16 and processes the received radar signals to produce an image. The data and signal processor 17 has aircraft parameters, navigation data and display parameters coupled to it from the aircraft 11 and the inertial navigation system 12 and by an operator from a keyboard, for example, for use thereby. The data and signal processor 17 is coupled to a display 18 that is used to display the radar image to the operator. The data and signal processor 17 is comprised of a signal processor 19, a perspective transformation processor 21, and a range cell formation processor 20 that implements the range cell formation process 30 in accordance with the present invention.

The perspective transformation processor 19 transforms image data in range-azimuth coordinates (B-scan) to horizontal-vertical display coordinates (C-scan). The perspective transformation processor 19 is described in U.S. patent application Ser. No. 08/269,407, filed Jun. 30, 1994, entitled "Precision High Speed Perspective Transformation From Range-Azimuth Format to Elevation-Azimuth Format", assigned to the assignee of the present invention. This processor 19 accounts for changes in aircraft attitude, altitude, lateral movement, sensor to display displacements, and delays between data collection and display. The processor 19 transforms the B-scan data into a virtual image on a head-up type display, displayed in C-scan format. The processor 19 takes a display pixel in display coordinates and computes corresponding range and azimuth coordinates.

The processor 19 allows the display of an airborne radar image on a head-up display 18 in real time. The transformation processor 19 employs matrix calculations for the vehicle's pitch, roll, and heading attitudes and attitude rates, vehicle altitude and velocity, sensor directions, sensor to display displacements, delay terms, and display scaling terms. The use of a 2nd order Taylor series approximation allows the matrix calculations to be done at frame initialization for the first pixel and the subsequent pixel to pixel calculations be performed as an incremental addition to the initial values. The use of the recursive form of the approximation reduces the pixel incrementing calculations to four operations per pixel. A range calculation is required to minimize errors at shallow elevation angles during a roll condition.

The processor 19 was designed for use in an Enhanced Vision Sensor System developed by the assignee of the present invention, wherein radar data in B-scan format is transformed by the present process into a perspective image that is displayed on the head-up display 18. The image is conformal to the real world and is updated at greater than ten frames per second. The Enhanced Vision System is adapted for use by airline pilots to see a runway and surrounding environment under low visibility conditions. The processor 19 allows the image display 18 to provide a high update rate that remains conformal while using a general purpose processor to perform the processing.

However, as was mentioned above, the B-scan to C-scan transformation process that computes a range-azimuth point for a given elevation-azimuth point using the perspective transformation processor 19, there may be many range cells covered by adjacent elevation points in farther range cases, or there may be a single range cell covering many elevation points in nearer range cases. The range cell formation process 30 eliminates situations where there are missing data points at the far range, and large areas that have the same data point at the near range.

Figure 2:
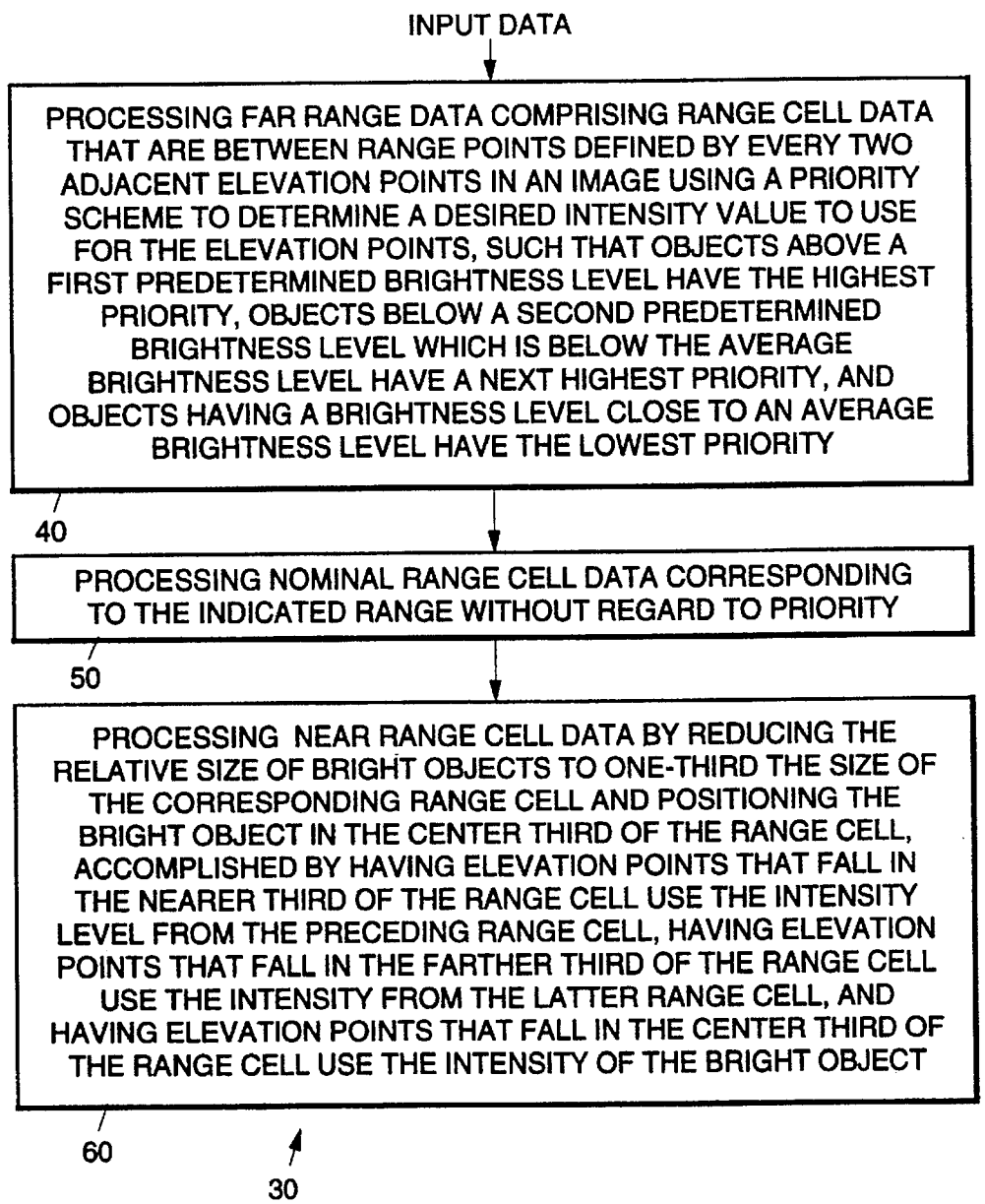
FIG. 2 is a flow diagram of the range cell formation process in accordance with the principles of the present invention used in the radar system of FIG. 1.

FIG. 2 is a flow diagram of the range cell formation process 30 in accordance with the principles of the present invention employed in the range cell formation processor 20 in the system 10 of FIG. 1. The range cell formation process 30 comprises three subprocesses, one each to process far range data (far range subprocess 40), nominal range data (nominal range subprocess 50), and near range data (near range subprocess 60).

FIG. 3 is a diagram illustrating the coverage relationship between elevation points 25 and range cells 26. In the far range region, many range cells 26 are located between adjacent elevation points 25. It can be viewed that an elevation point "covers" many range cells 26. The number of range cells 26 covered by the elevation point 25 varies from point to point and is a function of the imaging geometry at the time. Typically, the further out in range, the more range cells there are that are covered by an elevation point.

Referring again to FIG. 2, the far range subprocess 40 processes the range cell data covered by each adjacent elevation point 25 and uses a priority system to determine the best intensity value to use for the elevation points 25. The priority system is set up such that bright objects such as aircraft, tracks, airport lights, or hangers, for example, have the highest priority, followed by dark objects such as runways and taxiways, for example, and then followed by average intensity objects such as grass areas around the airport.

The data in the range cells 26 that are covered by adjacent elevation points 25 are processed 40 to determine which priority is met, and then the proper intensity is used. Starting with the nearest range bin that is covered by the elevation point 25 and ending at the last range bin that is covered by the elevation point 25, the processing 45 is as follows:

Calculations of maximum intensity, minimum intensity, and local average intensity are computed for a group of range cells 26. A counter is used to count the number of times the intensities in the group of range cells 26 is below a minimum threshold. This threshold is set to a fraction of the global average intensity of the entire image. The intensity to use for the elevation point 25 is determined in accordance with the following rules. (a) If the local average intensity is greater than a preset multiple of the global average intensity of the entire image, then the maximum intensity is used. (b) If the maximum intensity is greater than a preset multiple of the local average intensity, then the maximum intensity is used. (c) If rules (a) or (b) are not satisfied, and if the count of the number of times the intensities in the group of range cells 26 falls below the minimum threshold exceeds a preset number of times, then the minimum intensity is used. (d) If rules (a), (b) or (c) are not satisfied, then the local average intensity is used.

In the nominal range region, there is about a one-to-one correspondence between range cell increments and elevation point increments. It can be viewed that each elevation point 25 covers about one range cell 26. In this region, the nominal range subprocess 50 processes the data such that the intensity of the range cell 26 containing the elevation point 25 is used as the intensity of the elevation point 25.

In the near range region, adjacent range cells 26 extend over an elevation angle that contains many elevation points 25. It can be viewed that each range bin "covers" many elevation points 26. The number of range cells 26 it covers depends upon the imaging geometry at the time. Typically, the nearer in range, the more elevation points 25 it covers. Hence, from one elevation point 25 to the next, the intensity to use for the elevation point 25 may remain the same as for the previous elevation point 25 because it lies within the same range cell 26, or it may change because it crosses into the next range cell 26. If a range cell 26 contains an object with a bright intensity, the near range subprocess 60 resizes the range cell 26 width that contains the bright intensity such that it does not cover an entire range cell 26 in width but only one-half its width and such that it is centered in that range cell. Elevation points that fall within the center one-half of the range cell 26 have the intensity of the bright object, while those in the top quarter or bottom quarter of the range cell have the intensity of the neighboring range cell 26.

The near range subprocess 60 processing starts with the range cell 26 corresponding to the elevation point that gives the closest range and proceeds until the elevation points 25 reach a one-to-one correspondence with the range cells 26 and is as follows. In the range cell 26 that corresponds to the elevation point 25 currently in process and in the adjacent nearer range cell 26, the intensity in the two cells are compared. If the intensity of one range cell 26 exceeds the other by a preset value, the width resize processing is performed. If not, then the nominal range subprocess 50 is performed.

If the width resize processing is performed, the following intensity selection procedure is performed. (a) The intensity is initialized to be the intensity of the nearer range cell 26. (b) If the intensity of the farther of the two cells 26 is larger, then the intensity of the farther range cell 26 is used if either one of the following conditions are met: (i) if the range of the elevation point 25 currently in process is more than 0.75 of a range cell width rather from the center of the nearer range cell 26 or (ii) if the range of the elevation point 25 in process is more than 0.5 of a range cell width farther from the center of the nearer range cell 26, and if the difference between the range of the elevation point 25 currently in process and the range of the previous elevation point is less than one range cell width. (c) If the intensity of the nearer of the two cells 26 is larger, then the intensity of the farther range cell 26 is used if either of the following conditions are met: (i) if the range of the elevation point 25 in process is more than 0.5 of a range cell width farther from the center of the nearer range cell 26; or (ii) if the range of the elevation point 25 currently in process is more than 0.25 of a range cell width farther from the center of the nearer range cell 26, and if the difference between the range to the center of the nearer range cell 26 and the range of the previous elevation point 25 is less than or equal to 0.25 of a range cell width.

If the nominal range subprocess 50 is needed, then if the range of the elevation point 25 in process is more than 0.5 of a range cell width farther from the center of the nearer range cell 26, the intensity of the farther range cell 26 is used, otherwise, the intensity of the nearer range cell 26 is used.

Thus there has been described a new and improved process for enhancing the quality of an image following a perspective transformation from image data in the range-azimuth coordinate system (B-scan) into image data in the elevation-azimuth coordinate system (C-scan). It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. A range cell formation process for use with an image transformation system that transforms image data in range-azimuth coordinates (B-scan) to horizontal-vertical display coordinates (C-scan), said process comprising the steps of:

processing far range data comprising range cell data that are between range points defined by every two adjacent elevation points in an image using a priority scheme to determine a desired intensity value to use for the elevation points, such that objects above a first predetermined brightness level have the highest priority, objects below a second predetermined brightness level which is below the average brightness level have a next highest priority, and objects having a brightness level close to an average brightness level have the lowest priority;

processing nominal range cell data corresponding to the indicated range without regard to priority; and processing near range cell data by reducing the relative size of bright objects to one-third the size of the corresponding range cell and positioning the bright object in the center third of the range cell, accomplished by having elevation points that fall in the nearer third of the range cell use the intensity level from the preceding range cell, having elevation points that fall in the farther third of the range cell use the intensity from the latter range cell, and having elevation points that fall in the center third of the range cell use the intensity of the bright object.

2. The range cell formation process 30 of claim 1 wherein the step of processing far range data comprises:

processing each group of range cells to determine which priority level is met, and wherein if an object is detected in the range cells having a brightness level greater than the first predetermined brightness level, then the maximum intensity in the range cells is used, and if an object is detected in the range cells having a brightness level less than a predetermined level below the average brightness level, then the lowest intensity in the range cells is used, and otherwise, the average intensity of the range cells is used.

3. The range cell formation process of claim 2 wherein the step of processing far range data comprises:

calculating the maximum intensity, minimum intensity, and local average intensity of a group of range cells;

counting the number of times the intensities in the group of range cells is below a minimum threshold;

determining the intensity to use for the elevation point as follows:

(a) if the local average intensity is greater than a preset multiple of a global average intensity of the entire image, then the maximum intensity is used;

(b) if the maximum intensity is greater than a preset multiple of the local average intensity, then the maximum intensity is used;

(c) if (a) or (b) are not satisfied, and if the count of the number of times the intensities in the group of range cells falls below the minimum threshold exceeds a preset number of times, then the minimum intensity is used; and (d) if (a), (b) or (c) are not satisfied, then the local average intensity is used.

4. The range cell formation process of claim 3 wherein the minimum threshold is set to a fraction of the global average intensity of the entire image.

5. The range cell formation process of claim 1 wherein the step of processing processing near range cell data comprises:

comparing the intensities in a range cell that corresponds to the elevation point in the adjacent nearer range cell, and if the intensity of one range cell exceeds the other by a preset value, performing width resize processing to select the intensity by:

(a) initializing the intensity to the intensity of the nearer range cell;

(b) if the intensity of the farther of the two cells is larger, using the intensity of the farther range cell (i) if the range of the elevation point is more than 0.75 of a range cell width farther from the center of the nearer range cell; or (ii) if the range of the elevation point is more than 0.5 of a range cell width farther from the center of the nearer range cell, and if the difference between the range of the elevation point and the range of the previous elevation point is less than one range cell width; and (c) if the intensity of the nearer of the two cells is larger, the intensity of the farther range cell is used (i) if the range of the elevation point is more than 0.5 of a range cell width farther from the center of the nearer range cell; or (ii) if the range of the elevation point is more than 0.25 of a range cell width farther from the center of the nearer range cell, and if the difference between the range to the center of the nearer range cell and the range of the previous elevation point is less than or equal to 0.25 of a range cell width; and if the intensity of one range cell does not exceed the other by the preset value, performing nominal range subprocessing whereby if the range of the elevation point is more than 0.5 of a range cell width farther from the center of the nearer range cell, the intensity of the farther range cell is used, otherwise, the intensity of the nearer range cell is used.

* * * * *